UNITED STATES PATENT OFFICE.

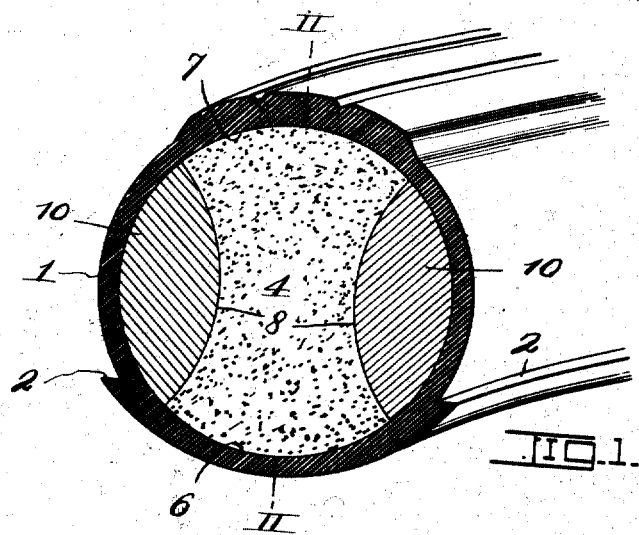
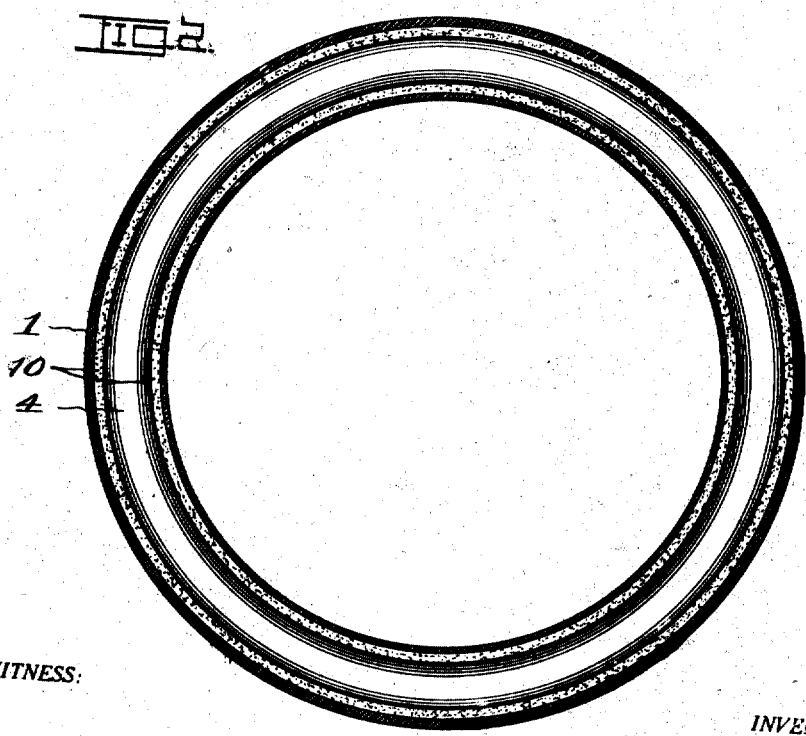

HENRY S. HAWKS, OF KANSAS CITY, MISSOURI.

AIRLESS TIRE.

1,281,364.   Specification of Letters Patent.   Patented Oct. 15, 1918.

Application filed December 7, 1917. Serial No. 205,919.

*To all whom it may concern:*

Be it known that I, HENRY S. HAWKS, a citizen of the United States, residing at Kansas City, in the county of Jackson and State of Missouri, have invented certain new and useful Improvements in Airless Tires, of which the following is a specification.

My invention relates to airless or solid tires, and among the objects of the invention, are the provision of a tire wherein the use of pneumatic tubes is dispensed with, one in which sufficient resiliency is obtained, one in which freedom from punctures, blowouts and the like is had, and one whereby greater mileage may be had than with the customary pneumatic tires.

In order that the invention may be fully understood, reference will now be made to the accompanying drawing, showing a preferred embodiment of the invention, and in which:

Figure 1 is a broken, perspective view, partly in section.

Fig. 2 is a side elevation of a tire with its casing in section on line II—II of Fig. 1.

Broadly speaking, the invention may be said to consist of an outer casing provided with an inner core of relatively soft and resilient material reinforced by a pair of diametrically opposed members of relatively stiff material interposed between the sides of the core and the adjacent sides of the casing for the purpose of preventing the core from becoming distorted by use.

Referring now in detail to the various parts, 1 designates a tubular casing provided with a pair of oppositely-disposed beads 2, adapted to be engaged by corresponding flanges of the wheel rim (not shown).

4 designates an annular core arranged within the casing and having its inner and outer peripheries 6 and 7, respectively, engaging the corresponding interior surfaces of the casing 1. Said core 4 has a pair of oppositely-disposed, annular grooves 8 approximately semi-elliptical in cross section to receive a pair of reinforcing members 10, provided for the purpose of sustaining the core and preventing it from becoming unduly distorted.

The core 4 is, preferably, made of relatively soft and resilient rubber, while the reinforcing members 10, are preferably, made of relatively hard material, so that said core and reinforcing members may be vulcanized to each other and to the casing 1, thus forming a solid tire devoid of air, and in which the several parts are prevented from creeping on each other with the detrimental effects incident thereto. In assembling the different parts, an opening is left all around the periphery of the casing to permit the insertion of the core 4 and the reinforcing members 10, after which the parts are vulcanized to each other, said opening in the casing being closed and sealed by the vulcanizing process.

From the foregoing description it is apparent that I have produced a composite tire, the core of which readily absorbs all shocks received by the casing and yet at the same time is protected from undue compression by the reinforcing members 10, which latter, while having a certain amount of resiliency to yield beneath the load, are instantly restored to normal when relieved of such load and thus restore the core to normal position.

Having thus described my invention, what I claim and desire to secure by Letters Patent, is:

1. An airless tire consisting of a casing, an annular core of comparatively soft and relatively resilient material fixed at its inner and outer peripheries to the interior of said casing and having diametrically opposed annular grooves of approximately semi-elliptical cross section, and a pair of annular reinforcing members of relatively stiff material and approximately elliptical cross section fixed to the grooved sides of said core and the adjacent inner sides of the casing.

2. An airless tire consisting of a casing, an annular core of comparatively soft and relatively resilient rubber vulcanized at its inner and outer peripheries to the interior of said casing, and a pair of annular reinforcing members of relatively stiff rubber vulcanized to the opposite sides of said core and the adjacent inner sides of the casing.

In testimony whereof I affix my signature in the presence of two witnesses.

HENRY S. HAWKS.

Witnesses:
F. G. FISCHER,
L. J. FISCHER.